No. 715,538. Patented Dec. 9, 1902.
W. F. BEDELL.
AMALGAMATOR.
(Application filed Dec. 2, 1901.)

(No Model.)

WITNESSES:

INVENTOR
William F. Bedell
BY
ATTORNEYS

UNITED STATES PATENT OFFICE.

WILLIAM FELIX BEDELL, OF KASLO, CANADA, ASSIGNOR, BY DIRECT AND MESNE ASSIGNMENTS, OF ONE-HALF TO DUNCAN McPHAIL AND THEODORE FREIDERICH ADAMS, OF KASLO, BRITISH COLUMBIA, CANADA.

AMALGAMATOR.

SPECIFICATION forming part of Letters Patent No. 715,538, dated December 9, 1902.

Application filed December 2, 1901. Serial No. 84,352. (No model.)

*To all whom it may concern:*

Be it known that I, WILLIAM FELIX BEDELL, a subject of the King of Great Britain, residing at Kaslo, in the Province of British Columbia and Dominion of Canada, have invented a new and Improved Amalgamator, of which the following is a full, clear, and exact description.

The invention relates to separators more especially designed for use in placer-mining to separate the heavy valuable material from the sand or other lighter material.

The object of the invention is to provide a new and improved amalgamator which is simple and durable in construction, very effective in operation, and arranged to utilize the head of material and water to actuate the machine and to insure proper action of the mercury on the heavy valuable material, including flour-gold, so that all the valuable material in the charge is completely saved and ready disposal is had of the tailings.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in both the views.

Figure 1:
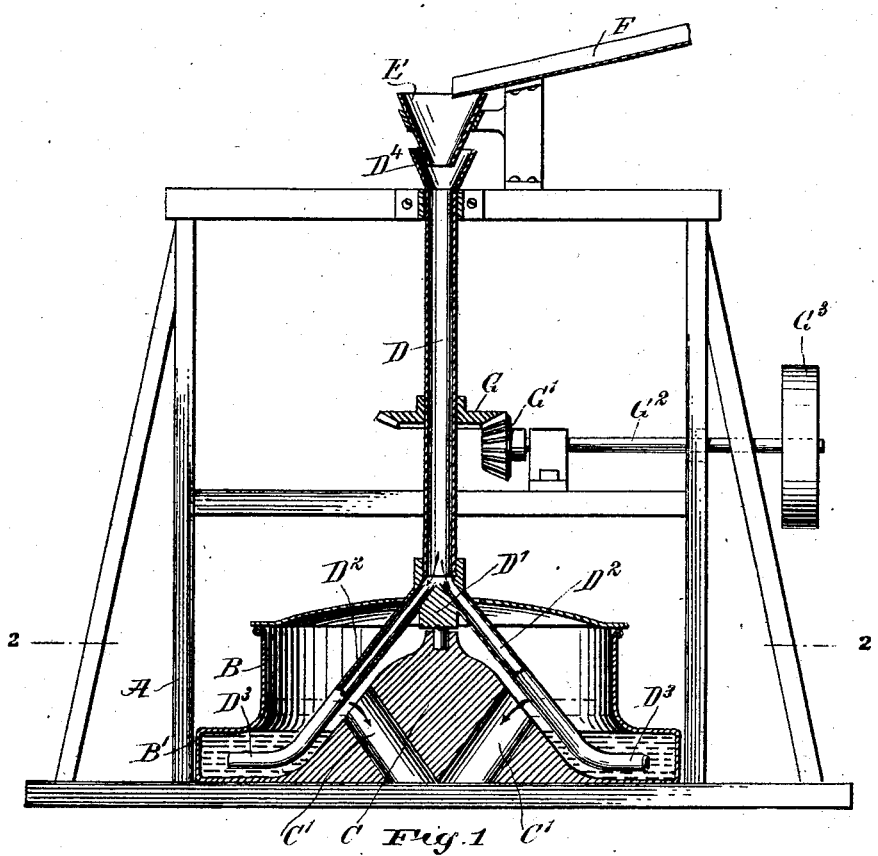
Figure 2:
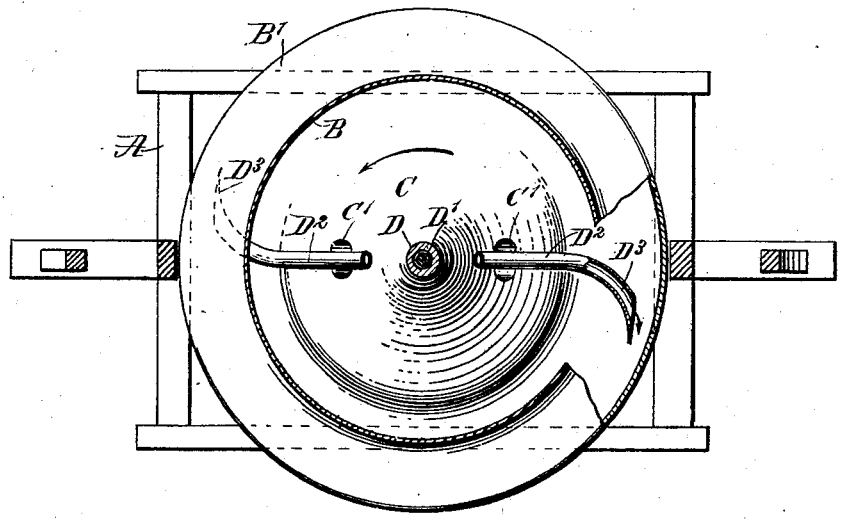

Figure 1 is a sectional side elevation of the improvement, and Fig. 2 is a sectional plan view of the same.

On a suitably-constructed framework A is arranged a tank B, having its lower portion B' enlarged, as is plainly indicated in the drawings, said lower portion containing the mercury for taking up the gold contained in the charge. In the tank B is centrally arranged a cone C, having outlets C' for the outflow of the water and sand, entrance to the said outlets C' being on the sides of the cone above the top of the enlarged portion B' of the tank B. In the apex of the cone C is stepped the lower end D' of a hollow shaft D, journaled near its upper end in suitable bearings carried by the framework A. The upper end of the shaft D is provided with a funnel $D^4$, into which discharges a stationary funnel E, carried by the framework, and an intake F discharges into this funnel E, so that the water and the gold-carrying sand and the like pass from the intake through the funnel E into the hollow shaft D. From the lower end of shaft D extend downwardly hollow reaction-arms $D^2$, having their lower ends $D^3$ arranged horizontally and curved in opposite directions, as is plainly illustrated in Fig. 2, so that the charge passing down the shaft D and through the reaction-arms $D^2$ cause the shaft D to turn, owing to the action of the charge on leaving the ends $D^3$. The ends $D^3$ are submerged in the mercury, and consequently the charge is discharged into the mercury, and as the arms rotate it is evident that the mercury contained in the tank comes in contact with the charge, so that the valuable material—such as gold, flour-gold, and the like—is readily taken up by the mercury, while the lighter material, such as sand, rises to the top surface of the mercury and finally flows through the outlets C' to the outside of the machine.

From the foregoing it will be seen that the machine is actuated very economically, as the head of the material furnishes the necessary power to rotate the shaft D and its reaction-arms $D^2$, so that the material is passed into the mercury and the latter is kept agitated to cause a ready taking up of the gold by the mercury.

In places where a sufficient head cannot be obtained it is necessary to employ other machinery for rotating the shaft D, and for this purpose said shaft is provided with a gear-wheel G, in mesh with a pinion G', secured directly on a shaft $G^2$, carrying a pulley $G^3$, connected with other machinery for imparting the rotary motion to the shafts $G^2$ and D.

The machine is very simple and durable in construction and is composed of comparatively few parts, and hence is not liable to easily get out of order.

Having thus fully described my invention, I claim as new and desire to secure by Letters Patent—

1. An amalgamator, comprising a tank for containing mercury and having in its bottom a central cone provided with outlets for the escape of water and sand, said outlets leading from the sides of the cone out through the bottom of the tank, a hollow shaft stepped in the cone, and hollow reaction-arms extending from the lower end of the said shaft downwardly to the lower portion of the tank and having their lower ends extending horizontally, as set forth.

2. An amalgamator, comprising a tank having an enlarged lower portion for containing the mercury, a cone held centrally in said tank and provided with outlets for the escape of sand and water, the entrance-openings of which are at the sides of the cone above the top of said lower enlarged portion of the tank, a hollow shaft stepped in said cone, and hollow reaction-arms leading from the lower end of the hollow shaft into the lower portion of the tank, the lower ends of the hollow arms being curved and submerged in the mercury contained in the enlarged portion of the tank, as set forth.

3. An amalgamator, comprising a tank having an enlarged lower portion for containing the mercury, a cone held centrally in said tank, and provided with outlets for the escape of the sand and water, the entrance-openings of which are at the sides of the cone above the top of said lower enlarged portion of the tank, a hollow shaft stepped in said cone, and hollow reaction-arms leading from the lower end of the hollow shaft into the lower portion of the tank, the lower ends of the hollow arms being oppositely curved and submerged in the mercury contained in the enlarged portion of the tank, and an intake connected with the upper end of said hollow shaft, as set forth.

4. An amalgamator, comprising a tank adapted to contain mercury and having in its bottom a cone provided with outlets for the escape of water and sand, said outlets leading from the sides of the cone downwardly and inwardly and out through the bottom of the tank, a hollow shaft stepped in the apex of the cone, and hollow arms extending downwardly from the lower end of the shaft to the lower portion of the tank and having their lower ends arranged horizontally and curved in opposite directions, as set forth.

5. An amalgamator, comprising a tank having its lower portion enlarged and adapted to contain mercury, a cone arranged centrally in the tank, and having inclined outlets for the escape of water and sand, the entrance-openings of the outlets being above the enlarged portion of the tank, a hollow shaft stepped in the apex of the cone, and inclined hollow arms extending from the lower end of the hollow shaft down on opposite sides of the cone into the enlarged portion of the tank, the lower ends of the arms being arranged horizontally and curved in opposite directions, as set forth.

6. An amalgamator, comprising a tank adapted to contain mercury and having in its bottom a cone provided with outlets for the sand and water, said outlets leading from opposite sides of the cone downwardly and inwardly toward each other and out through the bottom of the tank, a hollow revoluble shaft stepped in the apex of the cone, and hollow downwardly and outwardly inclined arms, said arms extending from the lower end of the shaft down on opposite sides of the cone into the lower portion of the tank and having their ends extending horizontally and curved in opposite directions, as set forth.

In testimony whereof I have signed my name to this specification in the presence of two subscribing witnesses.

WILLIAM FELIX BEDELL.

Witnesses:
CHARLES W. McANN,
NEIL Y. MACKAY.